United States Patent [19]

Sugiura

[11] Patent Number: 4,599,982
[45] Date of Patent: Jul. 15, 1986

[54] KNOCK CONTROL APPARATUS FOR INTERNAL COMBUSTION ENGINES

[75] Inventor: Noboru Sugiura, Mito, Japan

[73] Assignee: Hitachi, Ltd., Tokyo, Japan

[21] Appl. No.: 606,999

[22] Filed: May 3, 1984

[30] Foreign Application Priority Data

May 4, 1983 [JP] Japan .................. 58-77453

[51] Int. Cl.⁴ .................................. F02P 5/155
[52] U.S. Cl. ........................ 123/425; 73/35
[58] Field of Search ................. 123/425; 73/35

[56] References Cited

U.S. PATENT DOCUMENTS 4,368,635  1/1983  Yoshida ........................... 73/35
4,425,891  1/1984  Kashimura et al. ............. 123/425
4,433,654  2/1984  Yokooku ......................... 123/425

FOREIGN PATENT DOCUMENTS 59063  4/1982  Japan .

Primary Examiner—Tony M. Argenbright
Attorney, Agent, or Firm—Antonelli, Terry & Wands

[57] ABSTRACT

In an internal combustion engine knock control apparatus for detecting knocking phenomenon of an engine to control the timing of ignition of the engine, an output signal from a knock sensor is clamped at a value higher than a predetermined voltage value and half-wave rectified to produce a background signal. The background signal is compared with a knock signal to detect a knock intensity and the ignition timing of the engine is controlled in accordance with the detected knock intensity.

7 Claims, 23 Drawing Figures

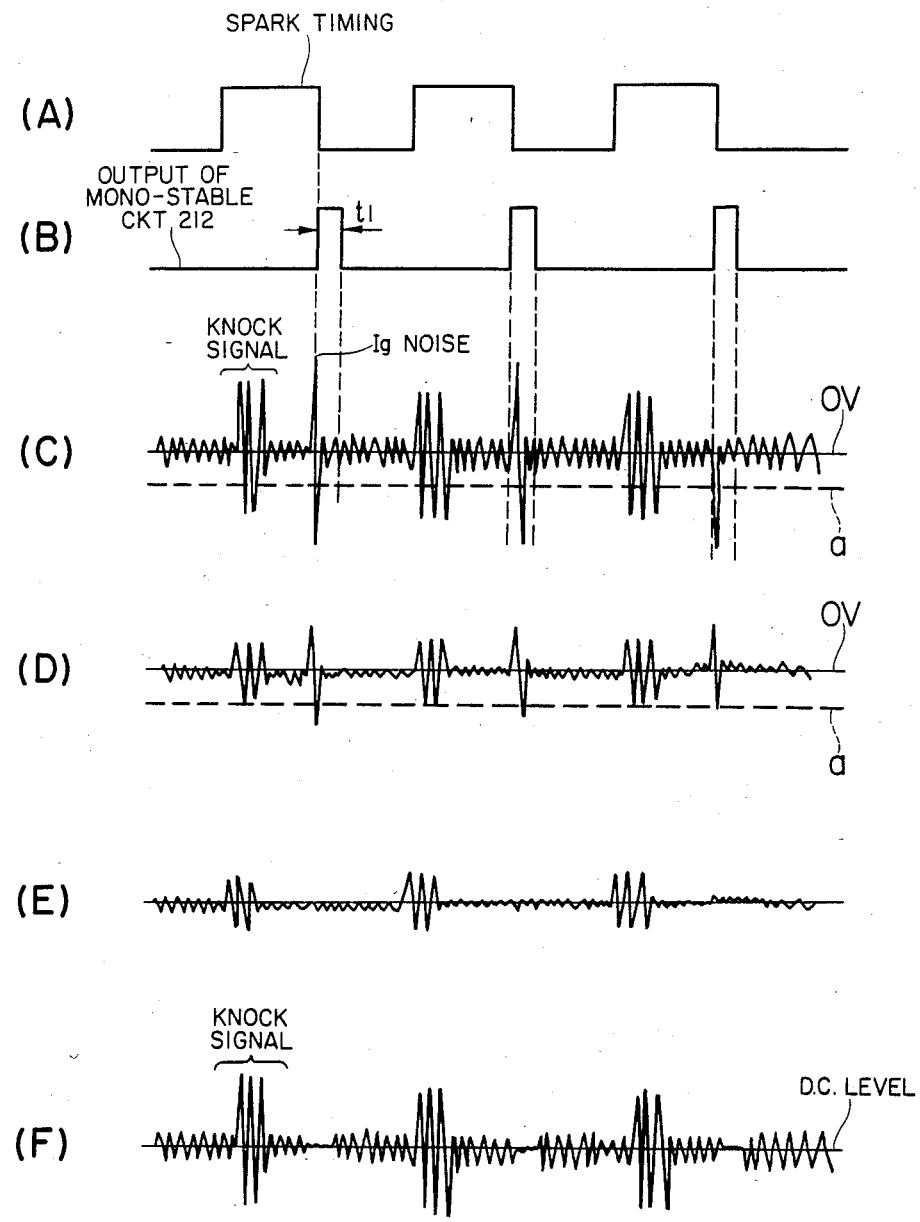

KNOCK CONTROL APPARATUS FOR INTERNAL COMBUSTION ENGINES

The present invention relates to knock control apparatus for internal combustion engines and more particularly to an internal combustion engine knock control apparatus capable of accurately detecting knock signals irrespective of the engine speed and properly controlling the occurrence of knocking.

The occurrence of knocking in an engine results in the occurrence of knocking sound so that the running performance of the engine is deteriorated and also the power output of the engine is decreased by the occurrence of counter torque or the engine is damaged due to overheating of the engine. It is known that the knocking has a close relation with the ignition timing and the maximum engine power can be produced by setting the ignition timing or the ignition advance angle just before the point of knocking in view of the characteristics of the engine. Thus, since retarding the ignition advance angle as a result of the prevention of knocking has the adverse effect of decreasing the engine power output, the ignition timing must be controlled to occur just before the point of knocking. Particularly, in the case of a turbocharger engine, the compression ratio is high and therefore the optimum ignition timing must be ensured so as to maintain the maximum efficiency. For this purpose, the occurrence of knocking in the engine must be detected accurately and the proper comparison between a knock signal and a background level must be ensured.

Generally, the output of a knock sensor increases with increase in the engine speed and hence the background level (BGL) increases correspondingly. Thus, at high engine speeds the occurrence of knocking can be detected accurately.

However, if all the outputs from the knock sensor are averaged to provide the desired background level, the resulting background level becomes so high as to cause a situation in which the detection of light knock is impossible. Thus, as proposed in Japanese Laid-Open Patent Application No. 57-59063, for example, an attempt has been made to detect a knock signal from the output of a knock sensor and mask the knock signal thereby preventing the knock signal from being reflected in the background level. However, there is a disadvantage that if all of the knock signals are masked, the background level is decreased so that signals other than those caused by the next knocking (i.e., knock signals) are also discriminated as knock signals and the ignition timing of the engine is retarded thereby greatly deteriorating the accuracy of knock detection.

It is the primary object of the present invention to provide a knock control apparatus which overcomes the foregoing deficiencies in the prior art and is capable of improving the accuracy of knock detection.

Thus, in accordance with the invention the accuracy of knock detection is improved by clamping a background voltage at a value higher than a predetermined voltage value and subjecting to half-wave rectification thereby producing a background level signal.

The present invention will become more apparent from the following description taken in conjunction with the accompanying drawings, in which.

Figure 10:
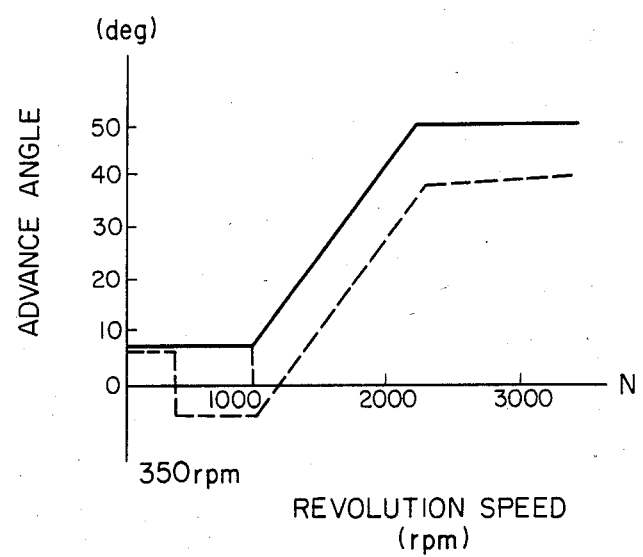

FIGS. 9(A)-(N) show a timing chart useful for explaining the operation of the apparatus according to the invention;

FIG. 10 is an engine speed-advance angle characteristic diagram of the apparatus according to the invention.

The present invention will now be described with reference to the illustrated embodiment.

Figure 1:
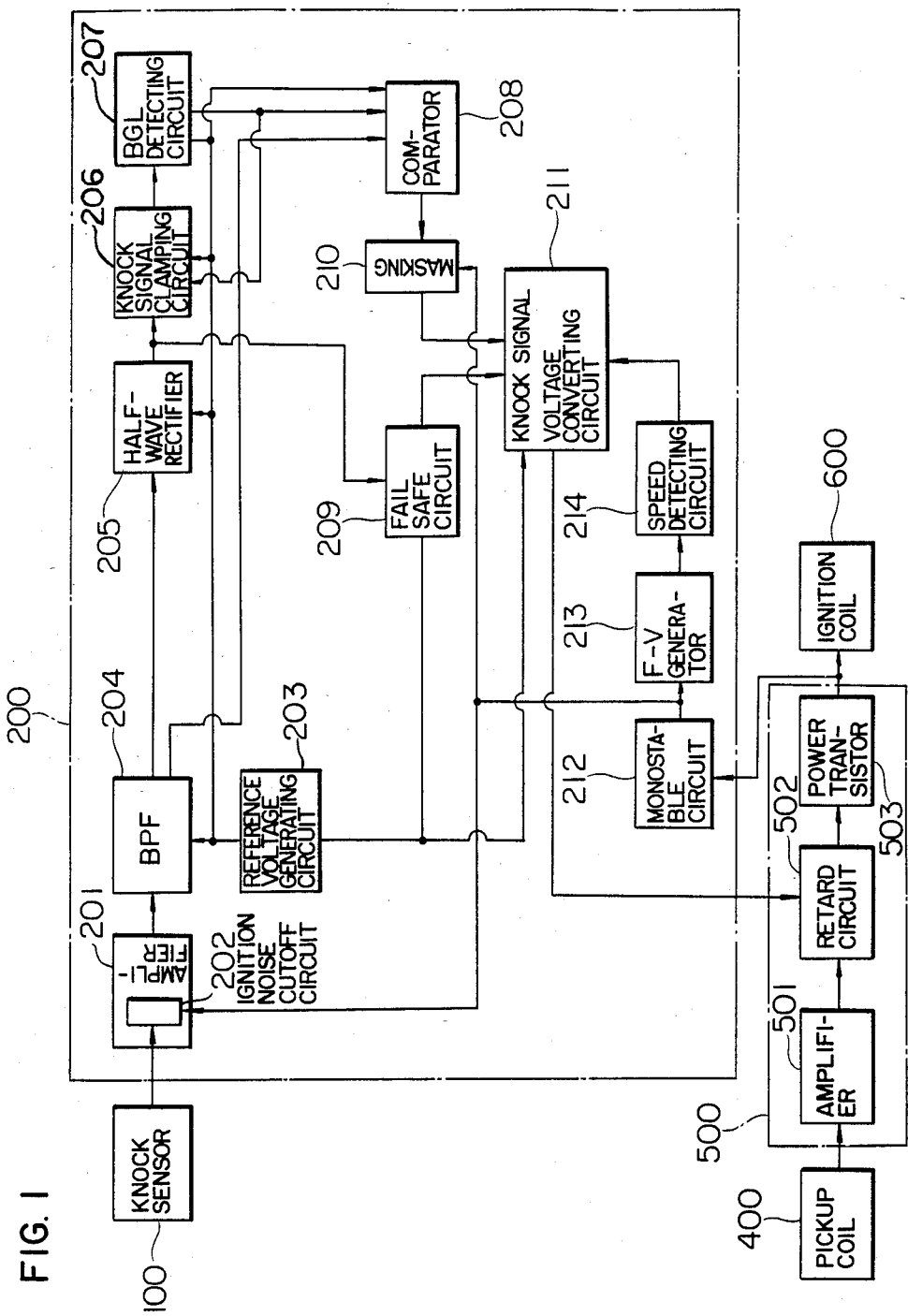
FIG. 1 is a block diagram showing the overall construction of an embodiment of the invention.

FIG. 1 shows the overall construction of an apparatus according to an embodiment of the present invention.

In the Figure, the knock control apparatus of the invention includes a knock sensor 100 for detecting a knock signal, a knock control unit 200 responsive to the knock signal applied from the knock sensor 100 to generate a control signal for controlling the ignition timing of an ignition coil 600, a pickup coil 400 for detecting the spark timing of the ignition coil 600, and a contactless ignition device 500 for igniting the ignition coil 600 in response to the outputs from the pickup coil 400 and the knock control unit 200 and supplying a feedback signal to the knock control unit 200.

The knock control unit 200 receives the detection signal from the knock sensor 100 and the output signal from the contactless ignition device 500 and controls the contactless ignition device 500 in response to the occurrence of knocking thereby advancing or retarding the ignition timing.

The knock control unit 200 includes an amplifier 201 including an ignition noise cutoff circuit 202 having a gate for cutting off ignition noise in synchronism with the spark timing, a band-pass filter or BPF 204 for knock signal band-pass purposes, a half-wave rectifier circuit 205 for suitably amplifying and half-wave rectifying the input signal from the BPF 204, a knock signal clamping circuit 206 responsive to a signal fed back from a background level detecting circuit 207 for effecting a clamping operation to prevent a high knock signal from entering the half-wave rectified signal from the half-wave rectifier circuit 205 and affecting the background level, the background level (BGL) detecting circuit 207 for producing an average value of the half-wave rectified signal generated from the half-wave rectifier circuit 205, a comparator 208 for comparing the output voltage of the BPF 204 and the output voltage of the BGL detecting circuit 207 to generate a retard signal proportional to the knocking, a masking circuit 210 for masking and generating the output of the comparator 208 at the desired timing, a knock signal voltage converting circuit 211 for integrating the output of the masking circuit 210 and generating a voltage value corresponding to the retard signal proportional to the knocking, a fail safe circuit 209 for detecting a fault in the knock sensor 100 and generating a signal to forcibly retard the ignition timing, a monostable circuit 212 responsive to the signal from the contactless ignition device 500 to generate a signal of a fixed pulse width in synchronism with the interruption of the ignition coil 600 (i.e., in synchronism with the base current to a power transistor 503), an F-V generator 213 responsive to the output pulse of the monostable circuit 212 to generate a voltage value proportional to the engine speed, a speed detecting circuit 214 responsive to the output from the F-V generator 213 to generate a signal corresponding to the engine speed, and a reference voltage generating circuit 203.

On the other hand, the contactless ignition device 500 includes an amplifier 501 for reshaping the waveform of an output signal from the pickup coil 400, a retard circuit 502 responsive to the output voltage of the knock control unit 200 to control the ignition timing, and the power transducer 503 for inducing a high voltage in the secondary winding of the ignition coil 600.

Next, the individual circuits of the knock control unit 200 will be described in detail.

Figure 2:
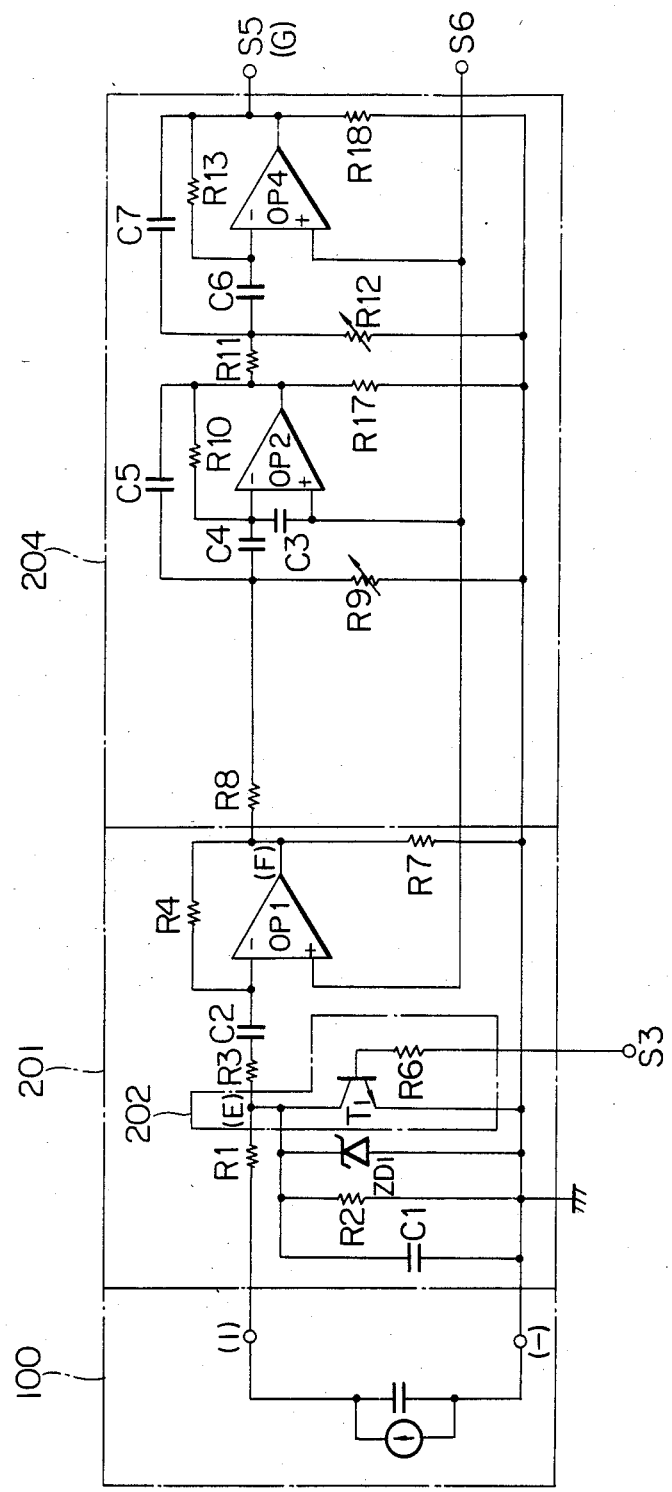
FIGS. 2 to 8 are detailed circuit diagrams of the individual, component parts shown in FIG. 1.

FIG. 2 shows the detailed circuit constructions of the knock sensor 100, the amplifier 201, the ignition noise cutoff circuit 202 and the band-pass filter or BPF 204.

More specifically, the knock sensor 100 is a capacitor-type sensor employing a piezoelectric element and it is effectively a parallel circuit of a capacitor C and a constant current source.

A resistor $R_1$ is connected to the positive terminal of the knock sensor 100 and connected to the other end of the resistor $R_1$ are a capacitor $C_1$, resistors $R_2$ and $R_3$, the cathode of a Zener diode $ZD_1$ and the collector of a transistor $T_1$. The other end of the capacitor $C_1$, the other end of the resistor $R_2$, the anode of the Zener diode $ZD_1$ and the emitter of the transistor $T_1$ are grounded and the base of the transistor $T_1$ is connected to the mono-stable circuit (OSM) 212 through a resistor $R_6$. Also, the negative input terminal of an operational amplifier $OP_1$ is connected to the other end of the resistor $R_3$ through a capacitor $C_2$. The operational amplifier $OP_1$ is negatively fed back through a resistor $R_4$ and resistors $R_7$ and $R_8$ are connected to the output terminal of the operational amplifier $OP_1$. The other end of the resistor $R_7$ is grounded and capacitors $C_4$ and $C_5$ and a variable resistor 9 are connected to the other end of the resistor $R_7$.

The amplifier 201 are formed by the resistors $R_1$, $R_2$, $R_3$, $R_4$ and $R_7$, the capacitor $C_2$ and the operational amplifier $OP_1$ and the ignition noise cutoff circuit 202 is formed by the transistor $T_1$ and the resistor $R_6$.

The other end of the variable resistor $R_9$ is grounded and the negative input terminal of an operational amplifier $OP_2$ is connected to the other end of the capacitor $C_4$. The output terminal of the operational amplifier $OP_2$ is connected to the other end of the capacitor $C_5$. A negative feedback is applied to the operational amplifier $OP_2$ through a resistor $R_{10}$. Also, a capacitor $C_3$ is connected between the positive and negative input terminals of the operational amplifier $OP_2$. The positive input terminal of the operational amplifier $OP_2$ is connected to the positive input terminal of the operational amplifier $OP_1$, the positive input terminal of an operational amplifier $OP_4$ and a terminal $S_6$. Also, resistors $R_{11}$ and $R_{17}$ are connected to the output terminal of the operational amplifier $OP_2$. The other end of the resistor $R_{17}$ is grounded and the other end of the resistor $R_{11}$ is connected to a variable resistor $R_{12}$ and capacitors $C_6$ and $C_7$. The other end of the variable resistor $R_{12}$ is grounded and the other end of the capacitor $C_6$ is connected to the negative input terminal of the operational amplifier $OP_4$. A negative feedback is applied to the operational amplifier $OP_4$ through a resistor $R_{13}$. Also, the other end of the capacitor $C_7$ is connected to the output terminal of the operational amplifier $OP_4$. The positive input terminal of the operational amplifier $OP_4$ is connected to the positive input terminal of the operational amplifier $OP_2$ and the output terminal of the operational amplifier $OP_4$ is also connected to a resistor $R_{18}$ and a terminal $S_5$. The other end of the resistor $R_{18}$ is grounded.

The resistors $R_8$, $R_9$, $R_{10}$, $R_{11}$, $R_{12}$, $R_{13}$, $R_{17}$ and $R_{18}$, the capacitors $C_3$, $C_4$, $C_5$, $C_6$ and $C_7$ and the operational amplifiers $OP_2$ and $OP_4$ form the band-pass filter (BPF) 204. The BPF 204 is a two-stage filter.

Figure 3:
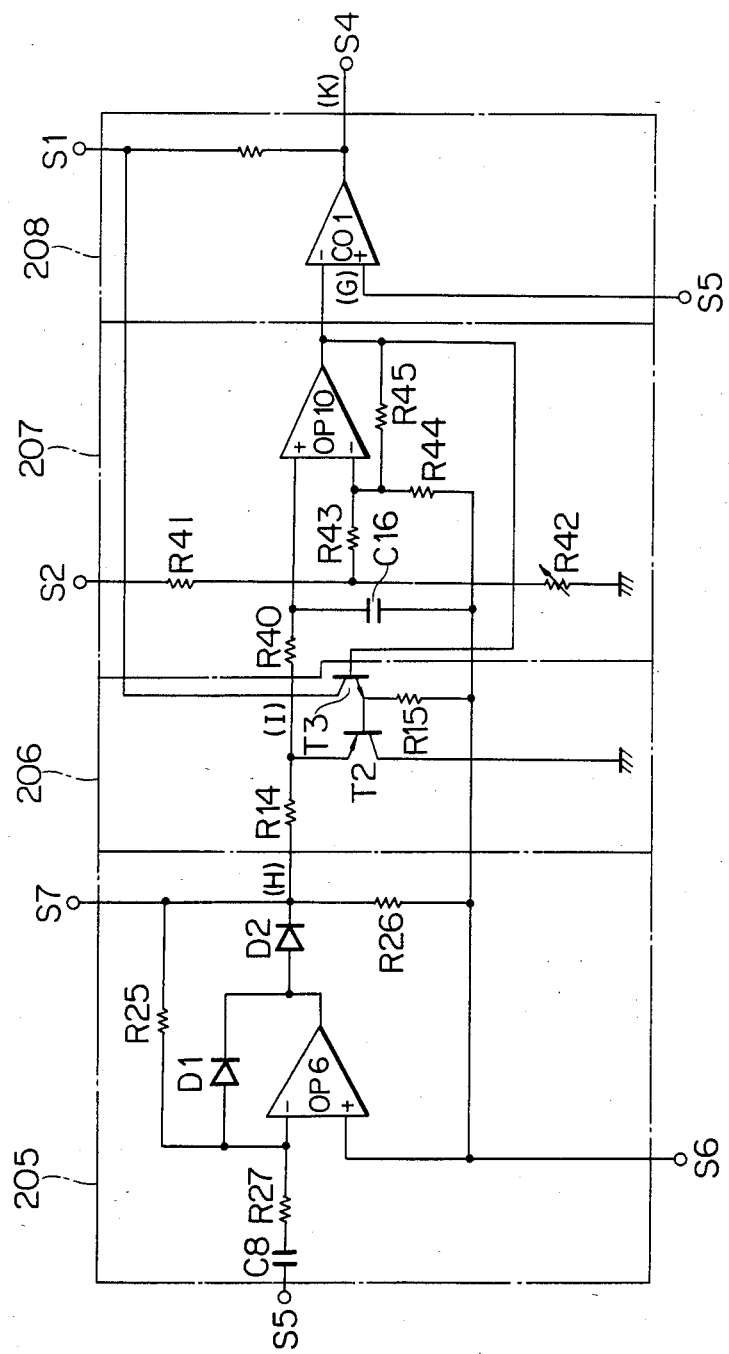

FIG. 3 shows a detailed circuit diagram of the half-wave rectifier circuit 205 as well as the knock signal clamping circuit 206, the BGL detecting circuit 207 and the comparator 208 which constitute a feature of the present invention.

A capacitor $C_8$ is connected to the terminal $S_5$ and the other end of the capacitor $C_8$ is connected to the negative input terminal of an operational amplifier $OP_6$ through a resistor $R_{27}$. The negative input terminal of the operational amplifier $OP_6$ is also connected to a resistor $R_{25}$ and the anode of a diode $D_1$. The cathode of the diode $D_1$ is connected to the output terminal of the operational amplifier $OP_6$ and the anode of a diode $D_2$. The cathode of the diode $D_2$ is connected to a terminal $S_7$, the resistor $R_{25}$ and resistors $R_{26}$ and $R_{14}$. Also, the positive input terminal of the operational amplifier $OP_6$ is connected to the other end of the resistor $R_{26}$ and the terminal $S_6$.

The half-wave rectifier circuit 205 is formed by the resistors $R_{25}$, $R_{26}$ and $R_{27}$, the capacitor $C_8$, the diodes $D_1$ and $D_2$ and the operational amplifier $OP_6$.

The other end of the resistor $R_{14}$ is connected to the emitter of a PNP transistor $T_2$ and a resistor $R_{40}$. The collector of the PNP transistor $T_2$ is grounded and its base is connected to a resistor $R_{15}$ and the emitter of an NPN transistor $T_3$. The other end of the resistor $R_{15}$ is connected to the terminal $S_6$ and the collector of the NPN transistor $T_3$ is connected to a terminal $S_1$. The base of the NPN transistor $T_3$ is connected to the output terminal of an operational amplifier $OP_{10}$.

The resistors $R_{14}$ and $R_{15}$ and the transistors $T_2$ and $T_3$ form the knock signal clamping circuit 206.

On the other hand, the other end of the resistor $R_{40}$ is connected to the positive input terminal of the operational amplifier $OP_{10}$ and a capacitor $C_{16}$. The other end of the capacitor $C_{16}$ is connected to the terminal $S_6$. The negative input terminal of the operational amplifier $OP_{10}$ is connected to resistors $R_{43}$, $R_{44}$ and $R_{45}$. The other end of the resistor 43 is connected to a resistor $R_{41}$ and a variable resistor $R_{42}$. The other end of the resistor $R_{41}$ is connected to a terminal $S_2$. Also, the other end of the resistor $R_{44}$ is connected to the terminal $S_6$. The other end of the resistor $R_{45}$ is connected to the output terminal of the operational amplifier $OP_{10}$. The output terminal of the operational amplifier $OP_{10}$ is also connected to the base of the NPN transistor $T_3$ and the negative input terminal of a comparator $CO_1$.

The resistors $R_{40}$, $R_{41}$, $R_{42}$, $R_{43}$, $R_{44}$ and $R_{45}$, the capacitor 16 and the operational amplifier $OP_{10}$ form the background level (BGL) detecting circuit 207.

The positive input terminal of the comparator $CO_1$ is connected to the terminal $S_5$ and its output terminal is connected to a terminal $R_{16}$ and a terminal $S_4$. The other end of the resistor $R_{16}$ is connected to the terminal $S_1$.

The comparator $CO_1$ and the resistor $R_{16}$ form the comparator 208.

Figure 4:
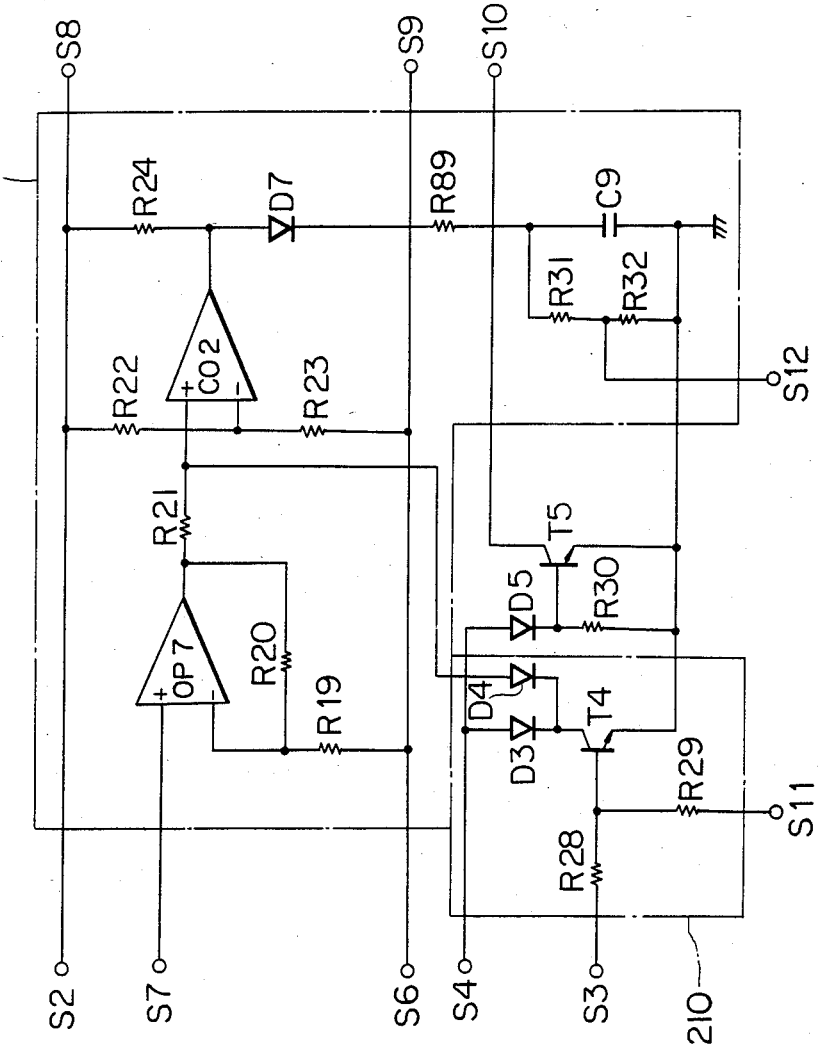

FIG. 4 shows the detailed circuit construction of the fail safe circuit 209 and the masking circuit 210.

In the Figure, resistors $R_{22}$ and $R_{24}$ and a terminal $S_8$ are connected to the terminal $S_2$ shown in FIG. 3. Also, the positive input terminal of an operational amplifier $OP_7$ is connected to the terminal $S_7$ shown in FIG. 3. The negative input terminal of the operational amplifier $OP_7$ is connected to resistors $R_{19}$ and $R_{20}$. The other end of the resistor 19 is connected to the terminal $S_6$ shown in FIG. 3 and a terminal $S_9$. The other end of the resistor $R_{20}$ is connected to the output terminal of the operational amplifier $OP_7$. The output terminal of the operational amplifier $OP_7$ is also connected through a resistor $R_{21}$ to the positive input terminal of a comparator $CO_2$ and the anode of a diode $D_4$.

The negative input terminal of the comparator $CO_2$ is connected to the other end of the resistor 22 and a resistor $R_{23}$. The other end of the resistor $R_{23}$ is connected to the terminal $S_9$. The output terminal of the comparator $CO_2$ is connected to the other end of the resistor $R_{24}$ and the anode of a diode $D_7$. The cathode of the diode $D_7$ is connected to a resistor $R_{89}$ whose other end is connected to a resistor $R_{31}$ and a capacitor $C_9$. The other end of the resistor $R_{31}$ is connected to a terminal $S_{12}$ and a resistor $R_{32}$.

The other end of the resistor $R_{32}$ and the other end of the capacitor $C_9$ are grounded.

The resistors $R_{19}$, $R_{20}$, $R_{21}$, $R_{22}$, $R_{23}$, $R_{24}$, $R_{31}$ and $R_{32}$, the diode $C_7$, the capacitor $C_9$, the operational amplifier $OP_7$ and the comparator $CO_2$ form the fail safe circuit 209.

On the other hand, the anode of a diode $D_3$ and the anode of a diode $D_5$ are connected to the terminal $S_4$ shown in FIG. 3. The cathode of the diode $D_3$ is connected to the collector of a transistor $T_4$ and the cathode of the diode $D_4$ is also connected to the collector of the transistor $T_4$. The emitter of the transistor $T_4$ is grounded and its base is connected to resistors $R_{28}$ and $R_{29}$. The other end of the resistor $R_{28}$ is connected to the terminal $S_3$ shown in FIG. 2 and the other end of the resistor $R_{29}$ is connected to a terminal $S_{11}$.

Also, the cathode of the diode $D_5$ is connected to a resistor $R_{30}$ and the base of a transistor $T_5$. The other end of the resistor $R_{30}$ and the emitter of the transistor $T_5$ are grounded and the collector of the transistor $T_5$ is connected to a terminal $S_{10}$.

The resistors $R_{28}$ and $R_{29}$, the diode $D_3$ and the transistor $T_4$ form the masking circuit 210.

Figure 5:
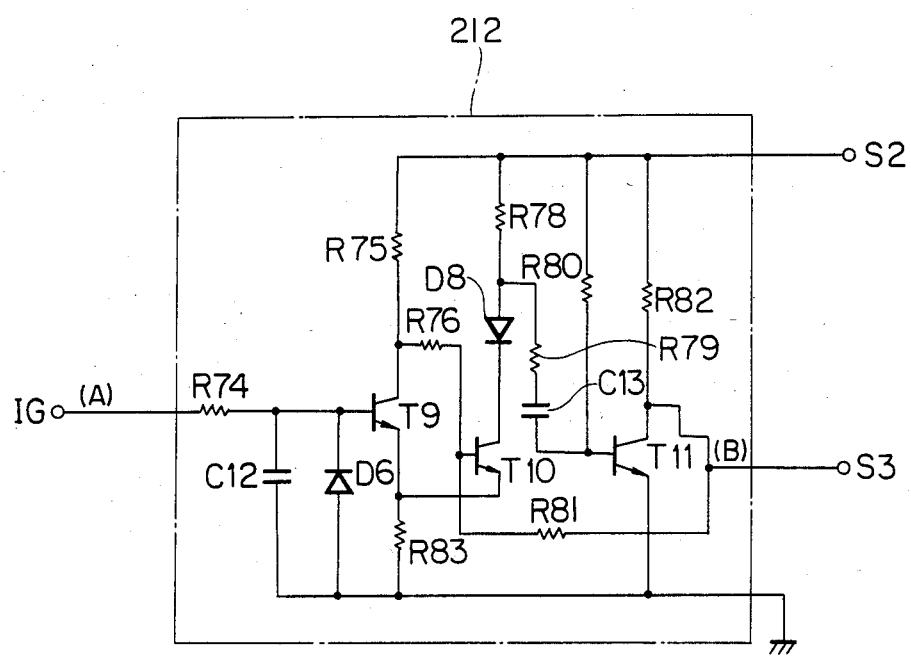

FIG. 5 shows the detailed circuit construction of the monostable circuit (OSM) 212.

In the Figure, a resistor $R_{74}$ is connected to an input terminal IG for the ignition signal or the output signal from the power transistor 503 and the other end of the resistor $R_{74}$ is connected to a capacitor $C_{12}$, the cathode of a diode $D_6$ and the base of a transistor $T_9$. The other end of the capacitor $C_{12}$ and the anode of the diode $D_6$ are grounded. The emitter of the transistor $T_9$ is grounded through a resistor $R_{83}$ and its collector is connected to resistors $R_{75}$ and $R_{76}$. The other end of the resistor $R_{75}$ is connected to the terminal $S_2$ shown in FIG. 3 and the other end of the resistor $R_{76}$ is connected to the base of a transistor $T_{10}$ and a resistor $R_{81}$. The emitter of the transistor $T_{10}$ is grounded through a resistor $R_{83}$ and its collector is connected to the cathode of a diode $D_8$. The anode of the diode $D_8$ is connected to resistors $R_{78}$ and $R_{79}$. The other end of the resistor $R_{78}$ is connected to the terminal $S_2$ of FIG. 3 and the other end of the resistor $R_{79}$ is connected to the base of a transistor $T_{11}$ through a capacitor $C_{13}$. The transistor $T_{11}$ has its base connected to the terminal $S_2$ of FIG. 3 through a resistor $R_{80}$ and its emitter connected to the ground. The collector of the transistor $T_{11}$ is connected to the resistor $R_{81}$, a resistor $R_{82}$ and the terminal $S_3$ shown in FIG. 2. The other end of the resistor $R_{82}$ is connected to the terminal $S_2$ shown in FIG. 3.

The resistors $R_{74}$, $R_{75}$, $R_{76}$, $R_{78}$, $R_{79}$, $R_{80}$, $R_{81}$, $R_{82}$ and $R_{83}$, the capacitors $C_{12}$ and $C_{13}$, the diodes $D_6$ and $D_8$ and the transistors $T_9$, $T_{10}$ and $T_{11}$ form the monostable circuit 212.

Figure 6:
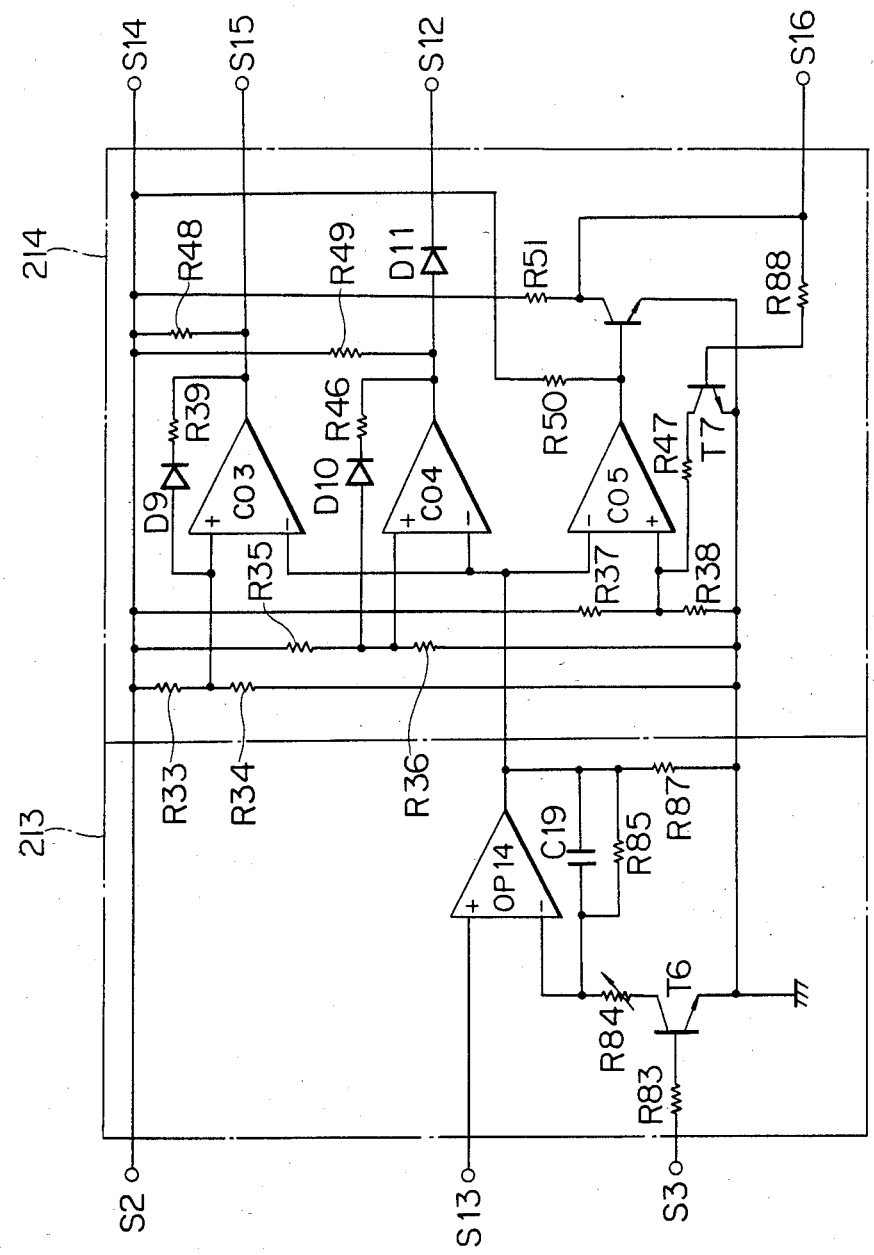

FIG. 6 shows the detailed circuit constructions of the F-V generator 213 and the speed detecting circuit 214.

In the Figure, the base of a transistor $T_6$ is connected to the terminal $S_3$ shown in FIG. 5 through a resistor $R_{83}$. The transistor $T_6$ has its emitter grounded and its collector connected to a variable resistor $R_{84}$. The other end of the variable resistor $R_{84}$ is connected to the negative input terminal of an operational amplifier $OP_{14}$, a capacitor $C_{19}$ and a resistor $R_{85}$. The output terminal of the operational amplifier $OP_{14}$ is connected to the other end of the capacitor $C_{19}$ and the resistor $R_{85}$, respectively. The output terminal of the operational amplifier $OP_{14}$ is also connected to a resistor $R_{87}$, the negative input terminal of a comparator $CO_3$ and the negative input terminal of a comparator $CO_5$. The other end of the resistor $R_{87}$ is grounded. The positive input terminal of the operational amplifier $OP_{14}$ is connected to a terminal $S_{13}$.

The resistors $R_{83}$, $R_{85}$ and $R_{87}$, the variable resistor $R_{84}$, the capacitor $C_{19}$ and the operational amplifier $OP_{14}$ form the F-V generator 213.

On the other hand, the terminal $S_2$ shown in FIG. 3 is connected to resistors $R_{33}$, $R_{35}$, $R_{37}$, $R_{48}$, $R_{49}$, $R_{50}$ and $R_{51}$ and a terminal $S_{14}$. The other end of the resistor $R_{33}$ is connected to a resistor $R_{34}$, the positive input terminal of the comparator $CO_3$ and the anode of a diode $D_9$. The other end of the resistor $R_{34}$ is connected to the ground. Also, the cathode of the diode $D_9$ is connected to the output terminal of the comparator $CO_3$ through a resistor $R_{39}$. The output terminal of the comparator $CO_3$ is also connected to the other end of the resistor $R_{48}$ and a terminal $S_{15}$.

The other end of the resistor $R_{35}$ is connected to a resistor $R_{36}$, the positive input terminal of the comparator $CO_4$ and the anode of a diode $D_{10}$. The other end of the resistor $R_{36}$ is grounded. Also, the cathode of the diode $D_{10}$ is connected to the output terminal of the comparator $CO_4$ through a resistor $R_{46}$. The output terminal of the comparator $CO_4$ is also connected to the other end of the resistor $R_{49}$ and the terminal $S_{12}$ of FIG. 4 through a diode $D_{11}$.

The other end of the resistor $R_{37}$ is connected to a resistor $R_{38}$, the positive input terminal of the comparator $CO_5$ and a resistor $R_{47}$. The other end of the resistor $R_{38}$ is grounded and the other end of the resistor $R_{47}$ is connected to the collector of a transistor $T_7$. The transistor $T_7$ has its emitter grounded and its base connected to a terminal $S_{16}$ through a resistor $R_{88}$. Also, the output terminal of the comparator $CO_5$ is connected to the other end of the resistor $R_{50}$ and the base of a transistor $T_{12}$. The transistor $T_{12}$ has its emitter grounded and its collector connected to the other end of the resistor $R_{51}$ and the terminal $S_{16}$.

The speed detecting circuit 214 is formed by the resistors $R_{33}$, $R_{34}$, $R_{35}$, $R_{36}$, $R_{37}$, $R_{38}$, $R_{39}$, $R_{46}$, $R_{47}$, $R_{48}$, $R_{49}$, $R_{50}$, $R_{51}$ and $R_{88}$, the diodes $D_9$, $D_{10}$ and $D_{11}$, the transistors $T_7$ and $T_{12}$ and the comparators $CO_3$, $CO_4$ and $CO_5$.

Figure 7:
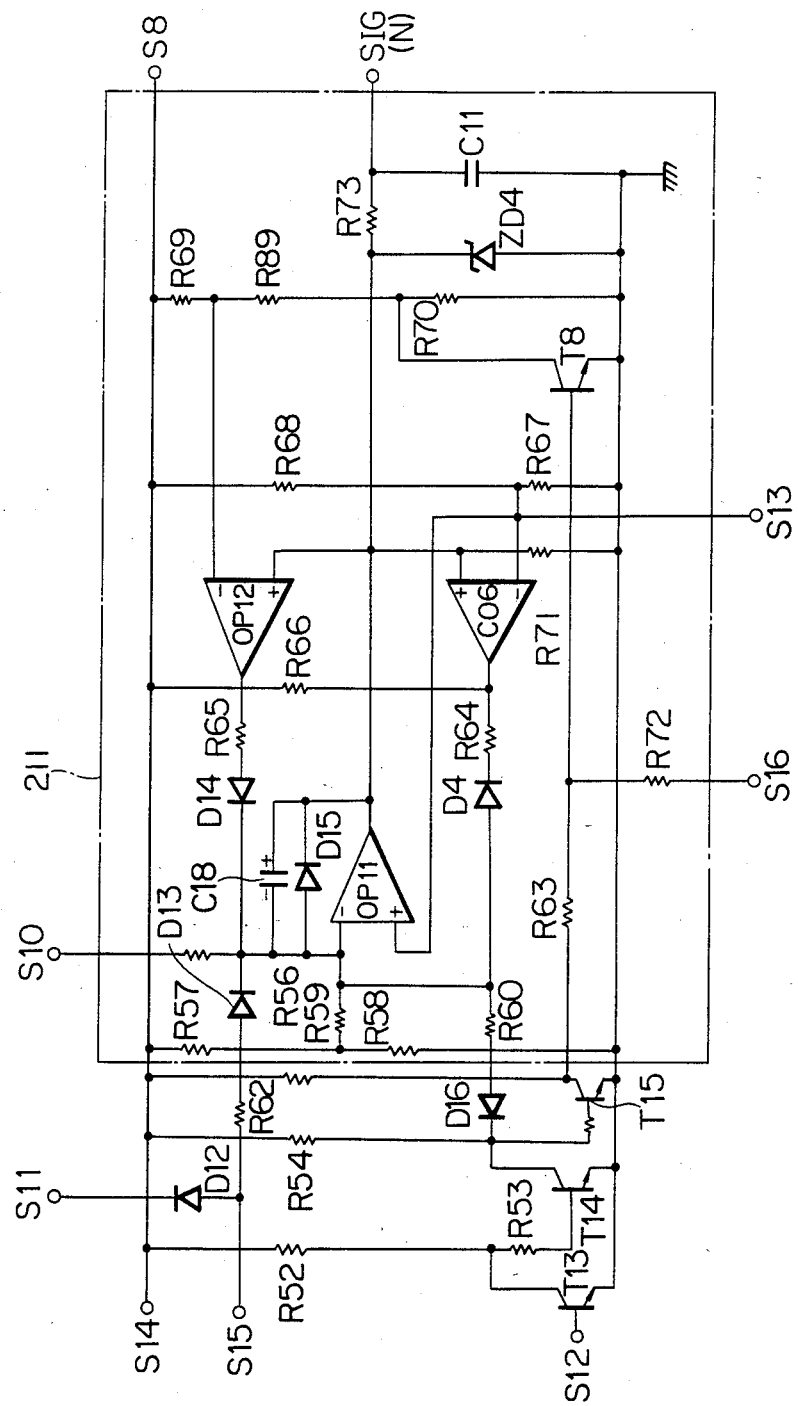

FIG. 7 shows the detailed circuit construction of the knock signal voltage converting circuit 211.

In the Figure, connected to the terminal $S_{14}$ shown in FIG. 6 are resistors $R_{52}$, $R_{54}$, $R_{56}$, $R_{57}$, $R_{66}$, $R_{68}$ and resistor $R_{69}$ and a terminal $S_8$. The other end of the resistor $R_{52}$ is connected to a resistor $R_{53}$ and the collector of a transistor $T_{13}$. The base of the transistor $T_{13}$ is connected to the terminal $S_{12}$ shown in FIG. 4. The other end of the resistor $R_{53}$ is connected to the base of a transistor $T_{14}$. The emitter of the transistors $T_{13}$ and $T_{14}$ are grounded. Also, the collector of the transistor $T_{14}$ is connected to the other end of the resistor $R_{54}$, the cathode of a diode $D_{16}$ and a resistor $R_{55}$. The anode of the diode $D_{16}$ is connected through a reistor $R_{60}$ to the anode of a diode $D_{17}$ and the negative input terminal of an operational amplifier $OP_{11}$. The other end of the resistor $R_{55}$ is connected to the base of a transistor $T_{15}$. The transistor $T_{15}$ has its emitter grounded and its collector connected to the other end of the resistor $R_{56}$ and a resistor $R_{63}$. The other end of the resistor $R_{63}$ is connected to the base of a transistor $T_8$ and a resistor $R_{72}$. The other end of the resistor $R_{72}$ is connected to the terminal $S_{16}$. Also, the transistor $T_8$ has its emitter grounded and its collector connected to resistors $R_{89}$ and $R_{70}$. The other end of the resistor $R_{70}$ is grounded and the other end of the resistor $R_{89}$ is connected to the other end of the resistor $R_{69}$ and the negative input terminal of an operational amplifier $OP_{12}$.

On the other hand, the terminal $S_{15}$ shown in FIG. 6 is connected to the anode of a diode $D_{12}$ and a resistor $R_{62}$. The cathode of the diode $D_{12}$ is connected to the terminal $S_{11}$ shown in FIG. 4. Also, the other end of the resistor $R_{62}$ is connected through a diode $D_{13}$ to a resistor $R_{61}$, the cathode of a diode $D_{14}$ and the negative input terminal of the operational amplifier $OP_{11}$. The other end of the resistor $R_{61}$ is connected to the terminal $S_{10}$ shown in FIG. 4. Also, the anode of the diode $D_{14}$ is connected to the output terminal of the operational amplifier $OP_{12}$ through a resistor $R_{65}$. The positive input terminal of the operational amplifier $OP_{12}$ is connected to the output terminal of the operational amplifier $OP_{11}$, the positive input terminal of a comparator $CO_6$ and a resistor $R_{71}$. The other end of the resistor $R_{71}$ is grounded. Also, the negative input terminal of the comparator $CO_6$ is connected to the positive input terminal of the operational amplifier $OP_{11}$, the terminal $S_{13}$ shown in FIG. 6, the resistor $R_{68}$ and a resistor $R_{67}$. The other end of the resistor $R_{67}$ is grounded. The output terminal of the comparator $CO_6$ is connected to the other end of the resistor $R_{66}$ and a resistor $R_{64}$. The other end of the resistor $R_{64}$ is connected to the cathode of the diode $D_{17}$ whose anode is connected to the negative input terminal of the operational amplifier $OP_{11}$ and to the anode of the diode $D_{16}$ through the resistor $R_{60}$.

Also, the other end of the resistor $R_{57}$ is connected to resistors $R_{58}$ and $R_{59}$. The other end of the resistor $R_{58}$ is grounded. The other end of the resistor $R_{59}$ is connected to the negative input terminal of the operational amplifier $OP_{11}$. The negative input terminal and output terminal of the operational amplifier $OP_{11}$ are bridged by a parallel circuit of a capacitor $C_{18}$ and a diode $D_{15}$. Also, the output terminal of the operational amplifier $OP_{11}$ is connected to a resistor $R_{73}$ and the cathode of a Zener diode $ZD_4$. The other end of the resistor $R_{73}$ is connected to a capacitor $C_{11}$ and an output terminal SIG. Also, the anode of the Zener diode $ZD_4$ and the other end of the capacitor $C_{11}$ are grounded.

Figure 8:
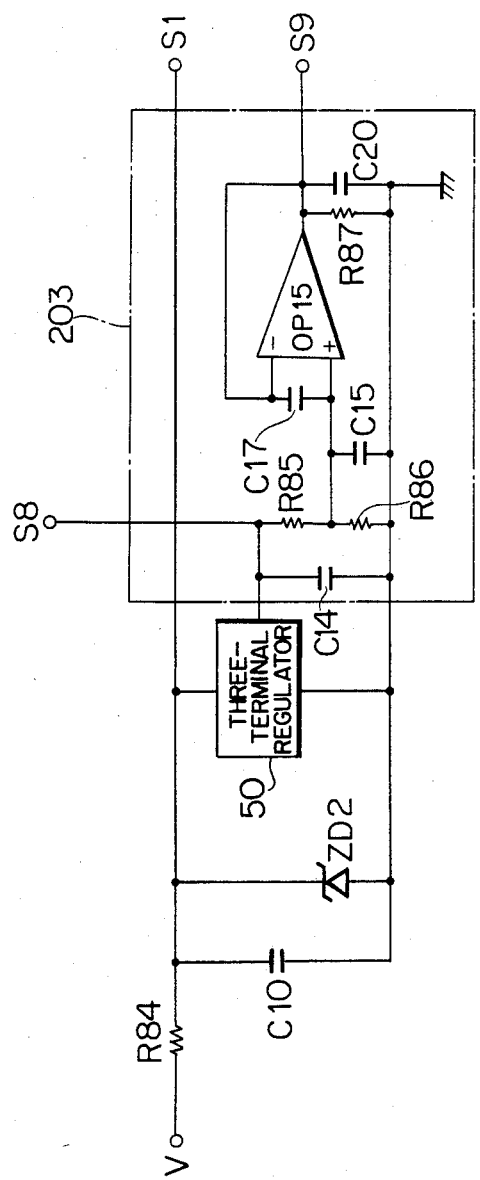

FIG. 8 shows the detailed circuit construction of the reference voltage generator 203.

In the Figure, a terminal V for the supply voltage (usually the battery voltage) is connected to a resistor $R_{84}$. The other end of the resistor $R_{84}$ is connected to a capacitor $C_{10}$, the cathode of a Zener diode $ZD_2$, a three-terminal regulator 50 (the Hitachi HA17M08) and the terminal $S_1$ shown in FIG. 3. The other end of the capacitor $C_{10}$, the anode of the Zener diode $ZD_2$ and the three-terminal regulator 50 are grounded. Also, the output terminal of the three-terminal regulator 50 is connected to a capacitor $C_{14}$, a resistor $R_{85}$ and the terminal $S_8$ shown in FIG. 4. The other end of the capacitor $C_{14}$ is grounded. The other end of the resistor $R_{85}$ is connected to a resistor $R_{86}$, a capacitor $C_{15}$ and the positive input terminal of an operational amplifier $OP_{15}$. The other end of the resistor $R_{86}$ and the other end of the capacitor $C_{15}$ are grounded. Also, the positive and negative input terminals of the operational amplifier $OP_{15}$ are connected through a capacitor $C_{17}$. The output terminal of the operational amplifier $OP_{15}$ is connected to a resistor $R_{87}$, a capacitor $C_{20}$, the negative input terminal of the operational amplifier $OP_{15}$ and the terminal $S_9$ shown in FIG. 4. The other end of the resistor $R_{87}$ and the capacitor $C_{20}$ are grounded.

The resistors $R_{85}$, $R_{86}$ and $R_{87}$, the capacitors $C_{14}$, $C_{17}$ and $C_{20}$ and the operational amplifier $OP_{15}$ form the reference voltage generator 203.

The operation of the knock control unit 200 will now be described.

Figure 9:
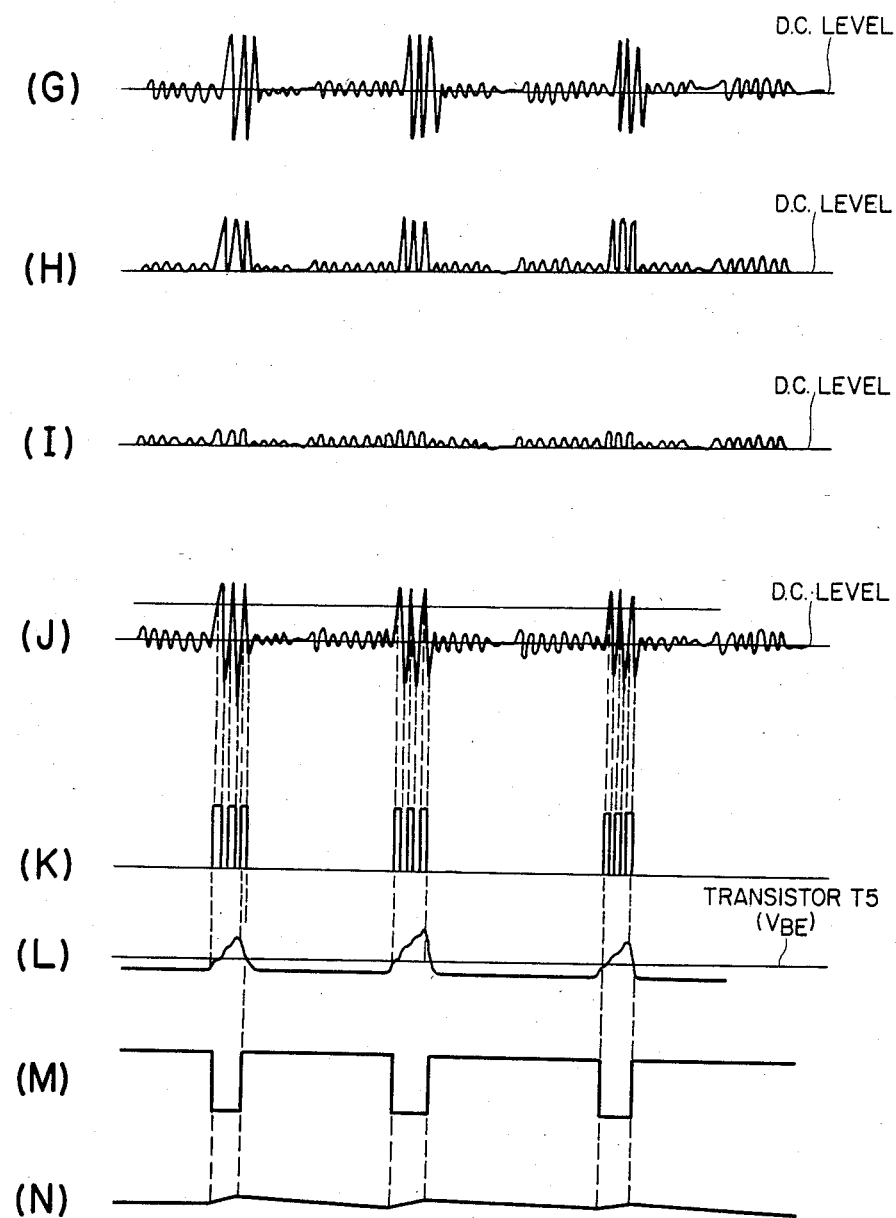

Firstly, when a signal as shown in (A) of FIG. 9 is applied to the IG terminal shown in FIG. 5, in response to the high level of the signal the transistor $T_9$ is truned on and the transistor $T_{10}$ is turned off. When the transistor $T_{10}$ is turned off, a path including the power supply terminal $S_1$, the resistors $R_{78}$ and $R_{79}$, the capacitor $C_{13}$ and the base of the transistor $T_{11}$ is provided for the capacitor $C_{13}$. On the other hand, in response to the low level of the base signal the transistor $T_9$ is turned off and the transistor $T_{10}$ is turned on thereby providing a path including the power supply terminal $S_1$, the resistor $R_{80}$, the capacitor $C_{13}$, the resistor $R_{79}$, the diode $D_8$, the transistor $T_{10}$, the resistor $R_{83}$ and the ground. The two paths form a charging and discharging circuit for the capacitor $C_{13}$ and a pulse having a time width $t_1$ and synchronized with the spark timing as shown in (B) of FIG. 9 is generated at the collector of the transistor $T_{11}$. This signal is applied to the base of the transistor $T_1$ in the ignition noise cutoff circuit 202 to provide an ignition noise cutoff signal and the signal is also applied to the base of the transistor $T_4$ in the masking circuit 210 to perform the ignition noise cutoff function. Shown in (A) of FIG. 9 is the ignition timing waveform and this waveform signal is in fact the base signal to the power transistor 503 in the contactless ignition device 500 which will be described later. The power transistor 503 is turned on by the high level of the base signal and the power transistor 503 is turned off by the low level of the base signal. A spark is generated in the ignition coil in the course of switching between the on and off operations. The signal shown in (B) of FIG. 9 is the fixed-width pulse output signal of the monostable circuit 212 which receives the base signal so as to be triggered by its transition from the high to the low level thereby generating a pulse signal of the fixed width $t_1$. In other words, the signal (B) is the waveform at the collector of the transistor $T_{11}$.

Then, increasing the input impedance of the knock control apparatus tends to cause the superposition of disturbance noise. The typical of the disturbance noise is ignition noise (Ig noise) produced in synchronism with the ignition timing.

The ignition noise in the apparatus will now be described.

The base of the power transistor 503 is controlled by a pulse as shown in (A) of FIG. 9. The power transistor 503 is turned on when the pulse goes to the high level and is turned off when the pulse goes to the low level. In the course of switching between the turning on and off or when the transistor 503 is turned off, the secondary voltage in the ignition coil rises rapidly and primary noise is generated. Also, the rise in the secondary voltage causes breakdown in the insulation of the air layer of the plug and the ignition takes place. This ignition causes secondary noise. The secondary noise includes noise due to a capacitive discharge current flowing during the initial period of the ignition and noise due to an inductive discharge current flowing during the following period. The latter noise is a large noise source in the secondary noise. If the input impedance is increased, the primary noise and the secondary noise (the noise of the former) are superposed as disturbance noise on the output of the knock sensor adversely affecting the knock signal discrimination.

Such disturbance noise must be eliminated. This disturbance noise lasts for a period of about 50 to 60 μsec. Thus, it is necessary to mask the knock sensor output during this period. The ignition noise cutoff circuit 202 is provided for attaining this object. However, the actual masking period is preset to a time width which is sufficiently longer than the noise duration time, e.g., about 0.8 msec.

As a result, when a signal as shown in (C) of FIG. 9 is generated from the knock sensor 100, the amplitude of the signal is decreased as shown in (D) of FIG. 9 due to the resistance division by the resistors $R_1$ and $R_2$ and then supplied to the ignition noise cutoff circuit 202. The signal detected by the knock sensor 100 is one which varies between positive and negative with respect to a dc zero level as a reference. The ignition noise cutoff circuit 202 performs the ignition noise cutoff function mainly through the action of the transistor $T_1$. The transistor $T_1$ is turned on and off in response to the output of the monostable circuit 212. The monostable circuit 212 is triggered by the falling edge of the base signal of the power transistor 503 shown in (A) of FIG. 9 thereby generating a pulse of the masking time width. Shown in (B) of FIG. 9 is this output of the monostable circuit 202 and the time width $t_1$ represents the masking time width. The transistor $T_1$ is turned on only during the interval $t_1$ in which the output of the monostable circuit 212 goes to "1". Thus, during the interval $t_1$ the knock sensor output is short-circuited to the ground so that no input is applied to the operational amplifier $OP_1$ and the masking effect is produced for ignition noise masking purposes.

The ignition noise cutoff circuit 202 generates a signal as shown in (E) of FIG. 9.

The signal shown in (E) of FIG. 9 is amplified by the operational amplifier $OP_1$ and then subjected to the feedback action of the reference voltage generating circuit 203 thereby generating a signal as shown in (F) of FIG. 9 as a dc level signal (3.0 V) from the output terminal of the operational amplifier $OP_1$.

The amplification factor G of the operational amplifier $OP_1$ is given by $$G = \frac{R_4}{R_1 + R_3}.$$

The signal shown in (E) of FIG. 9 is applied to the band-pass filter (BPF) 204.

The BPF 204 emphasizes the knock signal (i.e., attenuates the other signals) and delivers it, that is, the circuit has a characteristic which slightly attenuates at higher frequencies than the knock signal due to knocking.

In the half-wave rectifier circuit 205, only the positive component is half-rectified by the action of the diodes $D_1$ and $D_2$ and applied to the knock signal clamping circuit 206. Then, after passing through the clamping circuit 206, the signal is integrated and smoothed by an integrating circuit formed by the resistor $R_{40}$ and the capacitor $C_{16}$ of the BGL detecting circuit 207, amplified by the operational amplifier $OP_{10}$ and then applied to the comparator 208.

The gain G1 of the half-wave rectifier circuit 205 is given by $$G1 = \frac{R_{25}}{R_{27}} \quad (1)$$

and the gain $G_2$ of the amplifier formed by the resistors $R_{44}$ and $R_{45}$ and the operational amplifier $OP_{10}$ is given by $$G2 = 1 + \frac{R_{45}}{R_{44}} \quad (2)$$

Then, as regards the gain G3 of the integrator formed by the resistor $R_{40}$ and the capacitor $C_{16}$ responsive to the applied half-wave rectified signal, if E represents the half-wave peak voltage, then there holds $$R_{40}\frac{dq}{dt} + \frac{q}{c} = A \quad (3)$$

where
$t_0 \leq t \leq t_1$: A = Esin (ωt)
$t_1 \leq t \leq t_2$: B = 0
Therefore, the terminal voltage $V_c(t)$ of the capacitor $C_{16}$ is given by $$V_{c1}(t) = \frac{E}{1 + (\omega C_{16}R_{40})} \{\sin(\omega t) - \omega C_{16}R_{40}\sin(\omega t)\} + \quad (4)$$

$$\left\{ V_c(t_0) + \frac{\omega C_{16}R_{40}}{1 + (\omega C_{16}R_{40})^2} E \right\} e^{-\frac{1}{C_{16}R_{40}}}$$

where $t_0 \leq t \leq t_1$ $$V_{c2}(t) = V_{c1}(t_2)e^{-\frac{1}{C_{16}R_{40}}(t-t_1)} \quad (5)$$

Thus, in the steady state we obtain $V_{c1}(t_0) = V_{c2}(t_2)$

Therefore, $V_{c1}(t_0)$ is given by $$V_{c1}(t_0) = \frac{\omega C_{16}R_{40}}{1 + (\omega C_{16}R_{40})^2} \cdot \frac{1}{e^{\frac{t_0}{\omega C_{16}R_{40}}} - 1} \cdot E \quad (6)$$

Substituting $C_{16}R_{40}$ (=50 msec or over) and f (=5 kHz or over) in the equation (6), we obtain $V_{c1}(t_0) = E \cdot G_3 \approx E/\pi \quad (7)$ In other words, we obtain the following with respect to the absolute value voltage (the terminal voltage of the capacitor $C_{16}$) $V_{cf}(t_0)$ $$E = k \cdot V_{cf}(t_0).$$

Assuming now that $V_B$ respresents the signal voltage generated from the BPF 204, the voltage generated from the BGL detecting circuit 207 or the background voltage $V_{BGL}$ is given by $$V_{BGL} = V_B \cdot 1/k \cdot G1 \cdot G2 \tag{8}$$

The knock signal clamping circuit 206 constituting a feature of the invention will now be described.

Firstly, the signal generated as shown in (F) of FIG. 9 from the operational amplifier $OP_1$ of the amplifier 201 is applied to the BPF 204 so that the knock signal is emphasized and a signal as shown in (G) of FIG. 9 is generated from the operational amplifier $OP_4$ of the BPF 204. The signal generated from the BPF 204 is applied to the half-wave rectifier circuit 205. The half-wave rectifier circuit 205 applies to the knock signal clamping circuit 206 and the BGL detecting circuit 207 a signal which has been amplified by a given amount and half-wave rectified as shown in (H) of FIG. 9.

In the BGL detecting circuit 207, the applied signal is integrated and smoothed by the integrating circuit formed by the resistor $R_{40}$ and the capacitor $C_{16}$ and then amplified with an amplification factor G2 by the operational amplifier $OP_{10}$. The output signal of the operational amplifier $OP_{10}$ is a BGL signal. This BGL signal serves as an actuating signal for the knock signal clamping circuit 206.

In the knock signal clamping circuit 206, the knock signal is clamped at a BG voltage by the transistors $T_2$ and $T_3$. It has heretofore been known that if the whole knock signal (such signal exceeding a certain voltage value) were masked, the BG voltage would be decreased excessively thus discriminating a non-knocking signal as a knock as mentioned proviously. On the contrary, if a BG voltage is produced from the signal including a knock signal, the BG voltage would be increased excessively thus making it impossible to accurately detect the knock. To overcome these deficiencies in the prior art, the knock signal is clamped at the BG signal so that the BG signal assumes the proper value. In other words, the BG voltage is produced from a value at which the knock signal is clamped.

However, during the engine starting period the BG signal is the reference voltage (3 V) plus 0 V in the knock signal clamping circuit 206. As a result, if the knock signal is clamped at the BG voltage even during the starting period, the BG voltage indefinitely includes only the reference voltage and it is prevented from increasing any further. In other words, the knock control unit 200 itself is not actuated. Thus, the knock control unit 200 is operable at the actuating voltage of the knock signal clamping circuit 206 which is the reference voltage (3 V) plus 0.7 V. In other words, when the BG voltage is less than the reference voltage (3 V) plus 0.7 V, the knock signal clamping circuit 206 is not operated and thus the whole signal is used in the production of the BG voltage. Therefore, when the averaged value of the output signal from the half-wave rectifier circuit 205 exceeds the reference voltage (3 V) plus 0.7 V, the signal generated from the half-wave rectifier circuit 205 and having a value greater than the reference value (3 V) plus 0.7 V is clamped as shown in (I) of FIG. 9.

Thus, when the BG voltage exceeds the reference voltage (3 V) plus 0.7 V, the knock signal clamping circuit 206 comes into operation and a BG signal is produced by the clamped signal.

As a result, the BG signal generated from the BGL detecting circuit 207 and the signal generated from the BPF 204 are compared by the comparator 208 as shown in (J) of FIG. 9. The comparator $CO_2$ of the comparator 208 generates a rectangular waveform as shown in (K) of FIG. 9. This pulse signal is applied to the knock signal voltage converting circuit 211 through the masking circuit 210.

In the masking circuit 210, the transistor $T_4$ is turned on by the output signal from the monostable circuit 212 so that the current output of the comparator 208 flows to the ground through the transistor $T_4$ and it is masked. When the transistor $T_4$ is turned off, the output signal of the comparator 208 is applied to the transistor $T_5$ through the diode $D_5$ and the transistor $T_5$ is turned on.

In the knock signal voltage converting circuit 211 shown in FIG. 7, the operational amplifier $OP_{11}$, the capacitor $C_{18}$ and the diode $D_{15}$ form an output integrating circuit and the operational amplifier $OP_{12}$, the resistors $R_{65}$, $R_{69}$ and $R_{87}$ and the diode $D_{14}$ form a maximum voltage clamping circuit. Also, the comparator $CO_5$, the resistors $R_{67}$, $R_{64}$ and $R_{71}$ and the diode $D_{17}$ form a minimum voltage clamping circuit.

Now, in response to the output of the comparator 208 or the knock signal, the transistor $T_5$ is turned on in synchronism with the knock signal. Thus, as shown in (K) of FIG. 9, during the period of the knock signal pulse width $t_0$ (about 40 to 70 μsec) the transistor $T_5$ is turned on and a current $i_1$ flows from the operational amplifier $OP_{11}$ to the ground through the capacitor $C_{18}$, the resistor $R_{61}$ and the transistor $T_5$. At this time, the output voltage of the operational amplifier $OP_{11}$ is 3.0 V.

Thus, at this time the voltage rise rate per pulse (voltage rise/pulse) $\Delta V_1$ of the operational amplifier $OP_{11}$ is obtained from $$i_1 = \frac{3.0}{R_{61}} \tag{9}$$

$$\Delta V_1 = \frac{i_1}{C} t_0 \tag{10}$$

Here, the capacitance C represents the capacitance value of the capacitor $C_{18}$. As will be seen from the equation (10), the output voltage of the operational amplifier $OP_{11}$ increases in proportion to the number of knock pulses.

The Zener voltage of the Zener diode $ZD_4$ is 6 V. Also, the negative terminal of the operational amplifier $OP_{11}$ is at $-3$ V. As a result, each time a pulse is applied to the operational amplifier $OP_{11}$ from the comparator 208, the output voltage of the operational amplifier $OP_{11}$ decreases with the following voltage drop rate (drop voltage rate/period) $\Delta V_2$ $$i_2 = \frac{6 - 3.0}{R_{59} + R_{57}} \tag{11}$$

Therefore $$\Delta V_2 = \frac{i_2}{C} t_1 \qquad (12)$$

The voltage drop rate $\Delta V_2$ is preset to about 1/50 of the voltage rise rate $\Delta V_1$ in consideration of the power performances of the engine, such as, the engine torque and horsepower. The output of the output integrating circuit is clamped in such a manner that its maximum value is clamped at the clamping voltage of the maximum clamping circuit and its minimum value is clamped at the clamping voltage of the minimum clamping circuit.

The output integrating circuit is designed so that during the engine starting period the transistor $T_4$ is turned on by the output voltage of the 350 rpm detecting circuit of the speed detecting circuit 214 and the output of the comparator 208 is masked thus providing a specified spark advance characteristic (advance angles). In accordance with this spark advance characteristic, the output integrating circuit of the knock signal voltage converting circuit 211 generates a command and the retard circuit 502 effects the actual spark advance angle (retard angle) control. This retard circuit 502 may be of the same type as disclosed in U.S. patent application, Ser. No. 80,202, now U.S. Pat. No. 4,367,712, by Noboru Sugiura, filed Oct. 1, 1979 and assigned to the assignee of this application entitled "Ignition Timing Control System for Internal Combustion Engines".

The operation of the retard circuit 502 will now be described.

Generally, the ignition timing characteristic is of a relative nature and it is determined by the distributor and a certain operating mode determined by the ignition system used. Also, a maximum retard characteristic for knocking is predetermined so that the characteristic is used upon the occurrence of knocking. In FIG. 10 showing spark advance and retard characteristics, the solid line shows a minimum retard (minimum clamping voltage) characteristic in a certain operating mode and the broken line shows a maximum retard (maximum clamping voltage) characteristic under knocking conditions. At low engine speeds lower than 350 rpm, for example, the knock control is effected such that the maximum advance characteristic determined by the ignition timing characteristic is used. The reason for using this characteristic is to positively start the engine upon starting. In other words, if, during the engine start, the ignition timing is retarded, a counter torque is produced and the load on the starter is increased greatly. As a result, the driving current of the starter is increased abnormally and the engine is not operated thus causing a so-called starting failure. In order to prevent such starting failure, the maximum advance characteristic determined by the ignition timing characteristic is used during the starting operation of less than 350 rpm, for example.

FIG. 10 shows the characteristic of the retard circuit 502 which is required for accomplishing the above-mentioned features. As shown in the Figure, the circuit has a retard characteristic in the form of a fixed angle slope characteristic with respect to the output of the output integrating circuit in the knock signal voltage converting circuit 211 or the output voltage of the operational amplifier $OP_{11}$. In other words, it is so designed that the ignition timing is advanced a predetermined angle for every cycle while being retarded in accordance with the number of knock pulses.

Next, a description will be made of the operation of the output integrating circuit which controls the above-mentioned retard circuit 502, more particularly its starting action which provides a starting spark advance characteristic.

With the engine started through the operation of the starter, if the engine speed is below 350 rpm, the comparator $CO_3$ of FIG. 6 generates a high level output and the transistor $T_4$ is turned on by the output of the comparator $CO_3$ through the diode $D_{12}$ and the resistor $R_{29}$. When the transistor $T_4$ is turned on, the output (knock detection signal) from the comparator $CO_1$ of the comparator 208 shown in FIG. 3 is masked. As a result, the ignition timing is not retarded by the knock signal (including the noise signal). Also, the output of the comparator $CO_1$ is supplied to the output integrating circuit of the knock signal voltage converting circuit 211 of FIG. 7 through the resistor $R_{62}$ and the diode $D_{13}$ thereby selecting the starting maximum retard characteristic shown by the broken line in FIG. 10.

Next, the F-V generator 213 and the speed detecting circuit 214 shown in FIG. 6 will be described. The transistor $T_6$ of the F-V generator 213 is turned on in response to the establishment of two conditions that the output signal of the monostable circuit 212 goes to the high level and that the transistor $T_9$ is turned off. Thus, the transistor $T_6$ is turned on by the pulse of the width $t_1$ shown in (B) of FIG. 9. The period of this pulse is proportional to the engine speed and therefore the transistor $T_6$ is turned on and off in accordance with the engine speed. The voltage (about 1.7 V) at the junction point of the resistors $R_{67}$ and $R_{68}$ is applied to the positive terminal of the operational amplifier $OP_{14}$. When the transistor $T_6$ is turned on, a path including the capacitor $C_{19}$, the resistor $R_{84}$, the transistor $T_6$ and the ground is established from the output of the operational amplifier $OP_{14}$ and the capacitor $C_{19}$ is charged. When the transistor $T_6$ is turned off, the charge on the capacitor $C_{19}$ flows to the resistor $R_{85}$. The operational amplifier $OP_{14}$ generates an output corresponding to the difference between the voltages applied to its positive and negative input terminals and this output is applied to the negative input terminal of the comparators $CO_3$, $CO_4$ and $CO_5$, respectively. A fixed voltage (2.0 V) produced by the voltage division of the resistors $R_{33}$ and $R_{34}$ is applied to the positive input terminal of the comparator $CO_3$. Then, the voltage which is higher than 1.7 V and corresponding to the engine speed is applied to the negative input terminal of the comparator $CO_3$ and compared with the fixed voltage of 2 V. The output of the comparator $CO_3$ goes to the low level when the speed voltage is higher than 2 V and the output goes to the high level when the speed voltage is lower than 2 V. The voltage of 2 V forming a reference voltage corresponds to a low speed operation. More specifically, the engine speed corresponding to the voltage of 2 V is preset to 350 rpm. As a result, the output of the comparator $CO_3$ goes to the high level only when the engine speed is below 350 rpm.

On the other hand, a fixed voltage (3.0 V) produced by the voltage division of the resistors $R_{35}$ and $R_{36}$ is applied to the positive input terminal of the comparator $CO_4$. The voltage which is higher than 1.7 V and corresponding to the engine speed is applied to the negative input terminal of the comparator $CO_4$ and compared with the fixed voltage of 3 V. The output of the comparator $CO_4$ goes to the low level when the speed voltage is higher than 3 V and the output goes to the high level when the speed voltage is lower than 3 V. The reference voltage of 3 V corresponds to a high speed operation. More specifically, the engine speed corresponding to the voltage of 3 V is preset to 2,000 rpm. As a result, the output of the comparator $CO_4$ goes to the high level only when the engine speed is lower than 2,000 rpm. When the engine speed is below 2,000 rpm, the transistor $T_8$ of the knock signal voltage converting circuit 211 shown in FIG. 7 is turned on. When the transistor $T_8$ is turned on, the voltage applied to the negative input terminal of the operational amplifier $OP_{12}$ is decreased as compared with that applied when the transistor $T_8$ is off. Note that the purpose of the diode $D_{10}$ and the resistor $R_{46}$ is to provide a hysteresis characteristic and the reason for this is that since the knock signal voltage converting circuit 211 takes some time in responding to the speed of 2,000 rpm and the engine speed tends to increase somewhat during the interval, an output is generated which takes such speed increase into consideration.

On the other hand, the output of the operational amplifier $OP_{14}$ of the F-V generator 213 shown in FIG. 6 is applied to the negative input terminal of the comparator $CO_5$. A fixed voltage (5.0 V) produced by the voltage division of the series resistance of the resistors $R_{37}$ and $R_{38}$ is applied to the positive input terminal of the comparator $CO_5$. The voltage higher than 1.7 V and corresponding to the engine speed is applied to the negative input terminal of the comparator $CO_5$ and compared with the fixed voltage of 5 V. The output of the comparator $CO_5$ goes to the low level when the speed voltage is higher than 5 V and goes to the high level when the speed voltage is lower than 5 V. The reference voltage of 5 V corresponds to a high speed operation. More specifically, the engine speed corresponding to the voltage of 5 V is preset to 3,800 rpm. As a result, the output of the comparator $CO_5$ goes to the high level only when the engine speed is lower than 3,800 rpm. During the time that the output of the comparator $CO_5$ is at the high level, the base current of the transistor $T_8$ in the knock signal voltage converting circuit 211 of FIG. 7 is drawn by the transistor $T_{12}$. This is caused by the turning on of the transistor $T_{12}$ by the output of the comparator $CO_5$. Thus, when the engine speed exceeds 3,800 rpm, the output of the comparator $CO_5$ goes to the low level and the transistor $T_{12}$ is turned off. Consequently, the voltage supplied to the base of the transistor $T_8$ goes to the high level and the transistor $T_8$ is turned on. When the transistor $T_8$ is turned on, the voltage applied to the negative terminal of the operational amplifier $OP_{12}$ is decreased as compared with that applied when the transistor $T_8$ is off.

Next, the fail safe circuit 209 shown in FIG. 4 will be described. The fail safe circuit 209 detects an open or short condition and determines whether a background signal is present.

Firstly, the output of the half-wave rectifier circuit 205 is amplified by about ten times by the operational amplifier $OP_7$ and the resistors $R_{19}$ and $R_{20}$ In other words, if this amplification factor is represented by $S_1$, then the following is assumed $$S_1 = 1 + \frac{R_{20}}{R_{19}} \approx 10$$

The purpose of this amplification is to increase the resolution. In other words, when there is no knocking, a small signal is generated and this signal is amplified to detect a fault in the knock sensor. The amplified signal is compared with a fixed voltage (4.0 V) and it is generated as a pulse signal.

When there is an open fault in the knock sensor 100, no output is generated from the comparator $CO_2$. In the normal condition, the output of the comparator $CO_2$ goes to the high level in response to the output from the half-wave rectifier circuit 205. The capacitor $C_9$ is charged by the output of the comparator $CO_2$. As a result, the voltage at the junction point of the capacitor $C_9$ and the resistor $R_{89}$ is always high. In response to this high voltage, the transistor $T_{13}$ is turned on and the transistor $T_{14}$ is turned off. When the transistor $T_{14}$ is turned off, the resistor $R_{60}$ and the diode $D_{16}$ are not operated. Namely, nothing occurs when the knock sensor 100 is functioning normally.

When a fault occurs in the knock sensor 100, the comparator $CO_2$ generates no output (an open fault) or generates an output occasionally (a short fault). When the knock sensor 100 becomes faulty in this way, the capacitor $C_9$ is in a noncharged condition. As a result, the potential at the junction point between the capacitor $C_9$ and the resistor $R_{89}$ is always low. Therefore, the transistor $T_{13}$ shown in FIG. 7 is turned off so that in response to the turning off of the transistor $T_{13}$, the transistor $T_{14}$ is turned on and the transistor $T_{15}$ is turned off.

The transistor $T_{14}$ is also turned on and off in response to the output of the 2,000 rpm detecting circuit (the output of the diode $D_{11}$ shown in FIG. 6). In other words, when the engine speed is lower than 2,000 rpm, a high level output is generated from the diode $D_{11}$ and thus the fail safe circuit 209 comes into operation. When the engine speed is lower than 2,000 rpm and the terminal voltage of the capacitor $C_9$ is low, the transistor $T_{13}$ is turned off and the transistor $T_{14}$ is turned on. When this occurs, a current flow through the resistor $R_{60}$ and the diode $D_{16}$. As a result, the output of the operational amplifier $OP_{11}$ is caused by the capacitor $C_{18}$ to go to the high level. Simultaneously, the transistor $T_8$ is turned on and the ignition timing is retarded to the maximum retard angle.

In accordance with the present embodiment, there is thus no danger of the BGL being varied by any knock signal.

From the foregoing it will be seen that the present invention has the effect of improving the accuracy of knock detection.

I claim:

1. A knock control apparatus for internal combustion engines comprising:
   an amplifier for amplifying a signal generated from a knock sensor for detecting vibration of an engine;
   a filter for passing a knocking frequency range of an output from said amplifier;
   a rectifier circuit for rectifying an output from said filter;
   clamping means for clamping an output from said rectifier at a clamping voltage;
   background level detecting means for averaging an output from said clamping means;
   means for generating said clamping voltage at which said clamping means clamps the output from said rectifier on the basis of the average voltage from said background level detecting means so that said clamping voltage will continuously change in accordance with changes in the average voltage from said background level detecting means; and means for comparing the output from said filter with an output value from said background level detecting means to generate a signal for retarding an ignition timing in accordance with a knock intensity.

2. An apparatus according to claim 1, wherein said filter is a band-pass filter.

3. An apparatus according to claim 1, wherein said background level detecting means includes an operational amplifier whose output is applied to said clamping voltage generating means.

4. An apparatus according to claim 1, wherein said background level detecting means includes an integration circuit having a resistor and a capacitor to average the output from said clamping means.

5. An apparatus according to claim 1, wherein said clamping means includes a PNP type transistor having an emitter connected to an output circuit of said rectifier circuit, a base connected to an output circuit of said clamping voltage generating means and a collector connected to a predetermined reference potential.

6. An apparatus according to claim 5, wherein said clamping voltage generating means includes a resistor and means for controlling an electric current flowing through said resistor on the basis of the averaged voltage from said background level detecting means, said base of the PNP transistor being supplied with a voltage occurring across the resistor.

7. An apparatus according to claim 1, wherein said rectifier circuit is a half-wave rectifier.

* * * * *